United States Patent Office 3,433,754
Patented Mar. 18, 1969

3,433,754
PROCESS FOR THE PRODUCTION OF SYNTHETIC RESINS HARDENABLE BY MULTIESTERIFICATION
Herbert Honel, Graz-Andritz, Austria, assignor to Vianova Kunstharz Aktiengesellschaft, Vienna, Austria, a corporation
No Drawing. Filed Apr. 12, 1965, Ser. No. 447,552
Claims priority, application Austria, Apr. 13, 1964, A 3,197/64
U.S. Cl. 260—22     14 Claims
Int. Cl. C09d 3/68, 3/70

ABSTRACT OF THE DISCLOSURE

Improved compositions initially miscible in water and which are hardenable by heating are described. The compositions comprise a simple physical mixture and/or a partially esterified mixture which is still soluble of substantially equivalent proportions of (1) an additive compound prepared by substantially complete reaction of one part by weight of maleic anhydride and 1.5 to 2.5 parts by weight of a hydroxy-free polyol ester substantially of an unsaturated oil fatty acid selected from the group consisting of oil fatty acids with isolated double bonds and oil fatty acids with singly conjugated double bonds, and (2) a diol. The compositions are initially soluble in an organic solvent and after saponification with a nitrogen base are soluble in water or a mixture of water and an organic solvent. The hardening of the compositions upon heating is due to multiesterification.

The present invention relates to an improvement in the hardenable synthetic resins described in copending patent application Ser. No. 187,133, filed Apr. 12, 1962, now U.S. Patent No. 3,300,424, issued Jan. 24, 1967. The resins, which serve mainly as vehicles for paints and enamels, can be dissolved in organic solvents, or after saponification with alkalies such as ammonia or the water soluble amines, can be dissolved in water or diluted with water or water and minor amounts of an organic solvent.

The resins are produced by combining, preferably in equivalent proportion, polyols or higher molecular compounds rich in hydroxy groups with adducts of maleic anhydride and fatty oils or oil fatty acids or compounds containing these materials. The hardening of the resins is a result of a polyesterification reaction between the two components which takes place during the stoving process. The degree of polyesterification may be varied according to the stoving schedule, the minimum requirement being that the reaction product is in the insoluble state. The combination of the two components is either a purely physical mixture or the product of their partial inter-esterification. According to this prior invention, the weight ratio between maleic anhydride and the oil-like substance lies between 1:3 and 1:6, and preferably 1:4.5. For example, 1 mole of a natural oil glyceride and between 3 and 2 moles of maleic anhydride are compounded. The prior invention is based on the discovery that an addition compound of maleic anhydride and oils or the like with isolated or singly conjugated double bonds (such as linseed oil, soya bean oil, fish oils, dehydrated castor oil, isomerized soya bean oil) esterifies much faster than addition compounds of maleic anhydride and oils with multiply conjugated double bonds, such as tung oil, isomerized linseed oil, oiticica oil, and the like. Applying the weight ratios between malec anhydride and the adducting compound as described in the prior invention, diols can also be used as the polyhydroxy compounds, provided the diols are in equivalent proportion to maleic anhydride, leading to insoluble polyesterification products. However, the hardness obtained is not sufficient. Thus, when using diols as the polyhydroxy compounds, according to the prior invention, the co-employment of hardenable active polymethylol compounds was necessary.

It has now been found that it is possible to achieve products which bake to sufficiently hard films, under certain circumstances even with extraordinary hardness, using only diols as the polyhydroxy compound, provided the relative proportion of oil glyceride in the addition compound is further reduced to a ratio of 1 part by weight maleic anhydride to 1.5 part by weight as a minimum. Such a ratio corresponds to 2 moles maleic anhydride per fatty acid radical. The present invention also uses the oils preferred in the prior invention.

According to the present invention, an average of two olefinic linkages in each fatty acid radical is preferred, since a higher degree of unsaturation may adversely influence the adhesion of the films. The iodine number of the oil (or mixture of oils) should preferably lie between 120 and 170. However, oils with a higher iodine number, e.g., linseed oil (iodine number ±180), perilla oil (iodine number about 200), certain fish oils with iodine numbers above 200 may also be employed, particularly if the proportion of the oil in the complete combination product is relatively low, due to a high proportion of adducted maleic anhydride and/or due to the use of a relatively high molecular weight diol.

It is of essential importance for the water resistance and other film properties to ensure that the addition compound is practically free from unreacted maleic anhydride before it is combined with the diol. This may be effected either by complete adduction of the maleic anhydride or by its elimination from the addition compound by other means.

The molecular size of the addition compound is of special importance for the film hardness. According to the final hardness required, this may be effected either by a choice of certain oils or mixture of oils, e.g., co-employment of dehydrated castor oil or by heat polymerization, etc.

Diols, as the term is used in the present invention, include not only glycols, but also higher polyols with partially blocked (substituted) hydroxy groups, more particularly fatty acid monoesters of triols, such as glycerol, trimethylol ethanes, and the like.

The diol is combined with the addition compound at temperatures of about 100° C., as a rule, until the reaction mixture is completely clear, indicating that the partial additive esterification reaction is completed. If a higher molecular size is desired, heating may be continued.

The thus formed partial ester may be dissolved in an organic solvent or may be saponified with aqueous ammonia or another nitrogen base and may then be diluted with water. Glycols of low volatility or monoesters of triols may also be combined with the soap solution of the addition compound at ordinary temperature; however, combination at elevated temperatures before neutralization is preferred as a rule.

It is evident that the present invention offers great economical advantages due to the low price of commercially available glycols and maleic anhydride and, more particularly, if aqueous ammonia soap solutions are employed. Moreover, there are surprising technical advantages. Probably as a result of less steric hindrance, glycols having primary hydroxyl groups esterify much faster than other polyols with primary hydroxy groups. Therefore, the final hardness of the films may be obtained more easily under identical conditions. 1,4-butylene glycol, for example, esterifies so rapidly in certain cases that even careful heating with the addition compound does not prevent the formation of insoluble masses within the reaction mixture, unless at least a proportion of the anhydride groups of the addition compound is hydrolyzed first by saponification or by other means. Only low viscous addition compounds may be combined directly with 1,4-butylene glycol without the formation of insoluble masses. Although diols with primary hydroxy groups are preferred in the present process, diols having only secondary hydroxy groups or some secondary and some primary hydroxyl groups, such as 1,2-propylene glycol, 2,3-butylene glycol or dipropylene glycol, may also be used.

Polyesterification and thus film hardness may be catalyzed to a great extent by alkalies. If non-volatile or only slightly volatile polyvalent aliphatic amines are chosen, e.g., ethylene diamine, such as are mentioned in U.S. Patent No. 2,681,894, they will take part in the formation of the soap. Apparently, this property is lost during the baking process due to the formation of amides. Small additions of either the mentioned ethylene diamine or of its higher molecular derivatives, e.g., diethylene triamine, which are also commercially available, accelerate markedly the polyesterification reaction and thereby the hardening of the film. As set forth in the aforesaid patent, the co-employment of polyamines leads to additional cross-linking. Thus, the hardenability may be influenced in such a way that it is possible under certain circumstances, to reduce the ratio between maleic anhydride and the adding compound to the highest proportion mentioned in the prior invention, i.e., to 1 part by weight maleic anhydride to 3 parts by weight oil glyceride.

The same effect may be achieved by co-employing diols with amine groups, e.g., diethanol amine; this effect is stronger if the amine group is a primary one. However, polyols with tertiary amine groups, e.g., diethanolmethyl amine or triethanol amine, are less suitable, because the baked films remain relatively sensitive to water due to amine groups remaining intact, despite the accelerated or intensified hardening. As would be expected, when co-employing auxiliary substances, the proportion of the diol has to be reduced accordingly so as not to hinder the formation of amide groups.

A further remarkable technical advantage over the prior invention lies in the generally low viscosity of the aqueous soap solution of the partial addition compound-glycol ester, even if the addition compound has a high molecular weight. Thus, the co-employment of organic solvents to reduce the viscosity is hardly necessary. Also, the aqueous solutions exhibit excellent stability of all properties.

Furthermore, the co-employment of polyols other than diols is not excluded, however, usually sufficient film hardness is achieved only with diols. Thus, also the co-employment of hardenable methylol compounds is not necessary. Moreover, alkylphenol dialcohols may be co-employed, which, as is knwn, do not cause great hardness but can influence favorably the water resistance of the films.

Example 1

Under mild conditions (below 180° C.) 45 parts by weight of maleic anhydride are adducted to 100 parts of soya bean oil. Preferably, a surplus of maleic anhydride is employed which is distilled off afterwards by vacuum distillation. The resultant addition compound, 144 parts, has a relatively pale color and the consistency of a soft plastic resin.

320 g. of the addition compound (containing about 1 mole of compounded maleic anhydride) are heated to 95° C., together with 55 g. ethylene glycol. The mass is stirred for about 15–20 minutes, until the highly viscous emulsion-like liquid becomes clear and has a low viscosity when cold. Then a solution of 10.5 g. diethanol amine in 80 g. water is added, and 300 ml. 3 N ammonia. The obtained aqueous soap solution has a solid content of 50 percent. Dilution to 40 percent solids reduces the viscosity sufficiently for a clear varnish. After 30 minutes of baking at 140–150° C., a relatively pale, hard film with good gloss, elasticity and adhesion is obtained. The product may be used as a vehicle in the formulation of aqueous primers and single coat paints. The high gloss permits the production of colored finishes.

Example 2

An adduct is made from 120 parts soya oil, 50 parts linseed oil, 30 parts dehydrated castor oil, and 100 parts maleic anhydride under mild conditions, i. e., first the mixture is heated to 170–200° C., until 80 parts of the maleic anhydride are compounded, then the temperature is raised to 220° C. It takes about 10–12 hours to compound the maleic anhydride completely. By determination of the saponification number and other analytical methods, it can be found that in spite of the careful heating of the reaction mixture, only 85–90 percent of the calculated anhydride groups are available in the highly viscous addition compound.

300 parts of the addition compound, 75 parts diethylene glycol, and 75 parts water are stirred at 95–100° C., until after about 15–20 minutes the mixture is liquefied and becomes clear. The temperature is held for another hour to substantially completely hydrolyze the still available anhydride groups. After addition of 300 parts 8 percent ammonia and 15 parts triethylene tetramine, a viscous solution is obtained which has a solid content of 50 percent and is further dilutable with water to any desired extent. When the solid content is reduced to 30–35 percent, the viscosity is low enough for application by dipping, spraying or flow-coating. Baking at 140° C. for 15 minutes yields a film with great hardness. It is to be noted that pigmented films show a good gloss, even with a high pigment volume concentration. For example, black enamels may be formulated with excellent edge-hiding power and thus the problem of paints receding from edges, which is often encountered with aqueous vehicles, can be overcome.

Example 3

320 parts of the addition compound obtained according to Example 1, 60 parts 1,4-butylene glycol, the aqueous dialcohol obtained from 16 parts p-tertiary butyl phenol, and 60 parts water are heated to 95–100° C. with stirring. After only 10 minutes, the mass becomes clear and has a low viscosity. Thereafter, 60 parts water are slowly incorporated and the mass heated at 95–100° C. for an additional 50 minutes, then 16 parts triethylene tetramine and 160 parts 10 percent ammonia are added, whereby an aqueous solution with 60 percent non-volatile matter is obtained.

The solid vehicle is reduced to 40 percent or less to yield an aqueous varnish which bakes at 140° C. for 10 minutes to a hard, highly elastic film with good gloss and water resistance.

Example 4

170 parts linseed oil and 100 parts maleic anhydride are reacted to form an addition compound under conditions similar to Example 2. Since the addition compound obtained is highly viscous, it is dissolved in 25 parts ethylene glycol monoethyl ether acetate. Then 135 parts polyethylene glycol (molecular weight average 200), the dialcohol obtained from 13.5 parts p-tertiary octyl phenol and, 79 parts water are added to the addition compound. The mixture is heated to 95–100° C. Then the clear reaction mixture is dissolved in 250 parts 7 percent ammonia, 13.5 parts tetraethylene pentamine and 40 parts diethylene glycol monobutyl ether. The solution obtained has a solid content of 60 percent. The properties of the film are similar to those obtained according to Example 2, however, the film is softer and more elastic. The material may be used for the production of stoving primers.

Example 5

The 75 parts of diethylene glycol used in Example 2 are substituted by 95 parts of di-(1,2)-propylene glycol. The product obtained develops less hardness than the resin according to Example 2. Thus, it may also be used in the production of primers. However, it requires a longer stoving time or higher stoving temperatures by 15–20° C.

Example 6

An addition compound formed from 150 parts dehydrated castor oil, 150 parts safflower oil, and 100 parts maleic anhydride is heated to 120° C. together with 72 parts diethylene glycol. After the mixture has become clear, it is kept at 120° C. for an additional 10 minutes. Then 100 parts water are added in one portion and distributed uniformly in the mass by suitable means. The mixture is kept at 90° C. for 90 minutes to hydrolyze any anhydride groups still present. Then 230 parts of 4N ammonia and 24 parts triethylene tetramine are added. The aqueous solution obtained has a solid content of about 60 percent.

After dilution to 30–40 percent, the varnish may be applied similar to the product obtained according to Example 2. The pigmented paints exhibit a high gloss. Since the elasticity is greater than that of Example 2, this resin is an excellent vehicle for primers.

It is claimed:

1. Process for producing coating compositions hardenable by multiesterification, in which process a water miscible salt of a nitrogen base is prepared from a mixture consisting essentially of a simple physical mixture and/or a partially esterified mixture which is still soluble of substantially equivalent proportions of (1) an additive compound prepared by substantially complete reaction of one part by weight of maleic anhydride and 1.5 to 2.5 parts by weight of a hydroxy-free polyol ester substantially of an unsaturated oil fatty acid selected from the group consisting of oil fatty acids with isolated double bonds and oil fatty acids with singly conjugated double bonds, and (2) a diol.

2. The process according to claim 1 wherein the polyol fatty acid ester is a natural oil glyceride having an iodine number of from about 120 to 170.

3. The process according to claim 1 wherein the diol is selected from the group consisting of ethylene glycol, polyethylene glycol and 1,4-butylene glycol.

4. The process according to claim 1 wherein part of the diol (=dialcohol) is replaced by an alkyl phenol dialcohol in a proportion ranging from about 4–7 percent parts by weight of the additive compound.

5. The process according to claim 1 wherein a substance which is a member of the group consisting of primary and secondary amine diols is co-employed in a proportion ranging from about 3–7 percent by weight of the additive compound preferably reducing the total number of hydroxyl groups by one per each amine group.

6. Process for producing coating compositions hardenable by multiesterification, in which process a water miscible salt of a nitrogen base is prepared from a mixture consisting essentially of a simple physical mixture and/or a partially esterified mixture which is still soluble of substantially equivalent proportions of (A) an additive compound prepared by substantially complete reaction of one part by weight of maleic anhydride and 1.5 to 2.5 parts by weight of a hydroxy-free polyol ester substantially of an unsaturated oil fatty acid selected from the group consisting of oil fatty acids with isolated double bonds and oil fatty acids with singly conjugated double bonds, and (B) a combination of a diol and a non-volatile aliphatic primary or secondary poly amine, said poly amine being empolyed in proportions ranging from about 3 to 7 percent parts by weight of said additive compound.

7. A heat hardenable composition of matter which can be dissolved in an organic solvent, or after saponification with a nitrogen base can be dissolved in water or a mixture of water and organic solvent consisting essentially of a simple physical mixture and/or a partially esterified mixture which is still soluble of substantially equivalent proportions of (1) an additive compound prepared by substantially complete reaction of one part by weight of maleic anhydride and 1.5–2.5 parts by weight of a hydroxy-free polyol ester substantially of an unsaturated oil fatty acid selected from the group consisting of oil fatty acids with isolated double bonds and oil fatty acids with singly conjugated double bonds, and (2) a diol.

8. The composition of claim 7 wherein the polyol fatty acid ester is a natural oil glyceride having an iodine number of from about 120 to 170.

9. The composition of claim 7 wherein the diol is selected from the group consisting of ethylene glycol, polyethylene glycol and 1,4-butylene glycol.

10. The composition of claim 7 wherein part of the diol is replaced by an alkyl phenol dialcohol in a proportion ranging from about 4–7 percent parts by weight of the additive compound.

11. The composition of claim 7 wherein the diol includes a member of the group consisting of primary and secondary amine diols which is co-employed in a proportion ranging from about 3–7 percent by weight of the additive compound preferably reducing the total number of hydroxyl groups by one per each amine group.

12. A heat hardenable composition of matter which is water soluble consisting essentially of the nitrogen base salt of a simple physical mixture and/or a partially esterified mixture which is still soluble of substantially equivalent proportions of (1) an additive compound prepared by substantially complete reaction of one part by weight of maleic anhydride and 1.5–2.5 parts by weight of a hydroxy-free polyol ester substantially of an unsaturated oil fatty acid selected from the group consisting of oil fatty acids with isolated double bonds and oil fatty acids with singly conjugated double bonds, and (2) a diol.

13. An insoluble and infusible composition of matter which is initially soluble in an organic solvent and after saponification with a nitrogen base is soluble in water or a mixture of water and an organic solvent consisting essentially of the multi-esterification reaction product obtained by heating a simple physical mixture and/or a partially esterified mixture which is still soluble of substantially equivalent proportions of (1) an additive compound prepared by substantially complete reaction of one part by weight of maleic anhydride and 1.5–2.5 parts by weight of a hydroxy-free polyol ester substantially of an unsaturated oil fatty acid selected from the group consisting of oil fatty acids with isolated double bonds and oil fatty acids with singly conjugated double bonds, and (2) a diol.

14. A heat hardenable composition of matter which can be dissolved in an organic solvent, or after saponification with a nitrogen base can be dissolved in water or a mixture of water and organic solvent consisting essentially of a simple physical mixture and/or a partially esterified mixture which is still soluble of substantially equivalent proportions of (A) an additive compound prepared by substantially complete reaction of one part by weight of maleic anhydride and 1.5–2.5 parts by weight of a hydroxy-free polyol ester substantially of an unsaturated oil fatty acid selected from the group consisting of oil fatty acids with isolated double bonds and oil fatty acids with singly conjugated double bonds, and (B) a combination of a diol and a non-volatile aliphatic primary or secondary poly amine, said poly amine being employed in proportions ranging from about 3 to 7 percent parts by weight of said additive compound.

References Cited

UNITED STATES PATENTS

| | | | |
|---|---|---|---|
| 2,306,281 | 12/1942 | Rust | 260—404.8 |
| 2,312,732 | 3/1943 | Salathiel | 260—404.8 |
| 2,816,874 | 12/1957 | Schmutzler. | |
| 3,012,485 | 12/1961 | Bradley. | |
| 3,141,897 | 7/1964 | Crecelius et al. | 260—404.8 |
| 3,251,790 | 5/1966 | Christenson et al. | |
| 3,253,938 | 5/1966 | Hunt. | |
| 3,300,424 | 1/1967 | Hoenel et al. | 260—22 |

FOREIGN PATENTS 120,697  12/1945  Australia.

DONALD E. CZAJA, *Primary Examiner.*

R. W. GRIFFIN, *Assistant Examiner.*

U.S. Cl. X.R.

260—29.2, 32.4, 32.6, 33.2; 117—167